Aug. 2, 1932.  W. A. EATON  1,869,676

AIR SPRING

Filed June 28, 1929

INVENTOR

WILFRED A. EATON

BY

Brockett, Hyde, Higley & Meyer

ATTORNEYS

Patented Aug. 2, 1932

1,869,676

UNITED STATES PATENT OFFICE

WILFRED A. EATON, OF EDGEWOOD, PENNSYLVANIA

AIR SPRING

Application filed June 28, 1929. Serial No. 374,414.

This invention relates to so-called air springs in which advantage is taken of the elasticity of a gas such as air under compression. An air spring of the type to which reference is had is ordinarily adapted to act in yieldable resistance to compressive forces, and a common application is as the so-called shock absorber for an automotive vehicle wherein the pneumatic apparatus is interposed between the frame of the vehicle and a wheel or metal spring thereof.

Particularly in such service the principal parts of air springs are conveniently of generally cylindrical form, and there are many applications where, as owing to space limitations, it is desirable that these cylindrical parts be arranged on a horizontal axis. Since a mechanical seal is required, and since the parts and particularly those forming the seal must be lubricated, it has heretofore been considered impracticable to arrange the apparatus on other than a substantially vertical axis.

It is an object of my invention to provide such an apparatus which shall be capable of functioning on an axis of any direction, and particularly to this end one in which the sealing parts shall be efficiently lubricated regardless of their position. As a means to this end I employ liquid as well as gaseous fluid, and so arrange the parts that the working surfaces will be lubricated thereby at all times so that a constant efficient seal is assured.

A further object of the invention is to provide such an apparatus requiring a minimum of clearance space and thus serviceable in locations as well as positions in which other such apparatus could not be used. To this end I arrange the pneumatic parts on a common axis so that the apparatus so far as these parts are concerned is symmetrical in transverse section. Further, in order that these parts may have as slight longitudinal dimension as possible I arrange one of the usual pair of fluid-containing cavities within the piston or movable member of that pair of members which form the expansible chamber.

Figure 1:
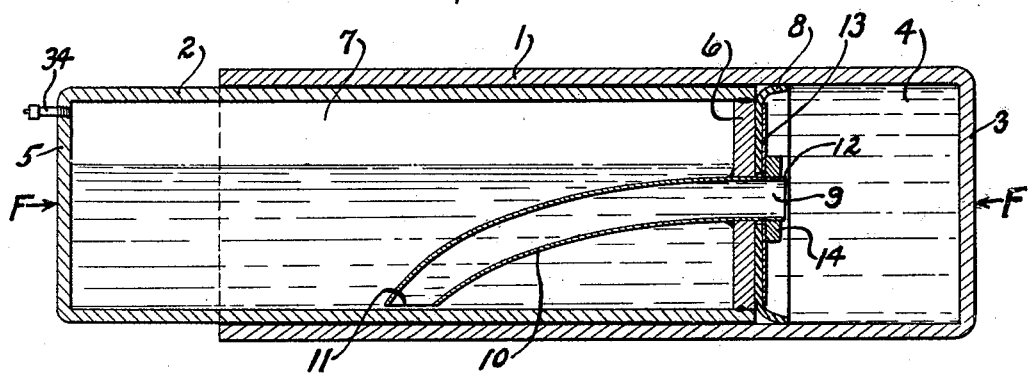
Figure 2:
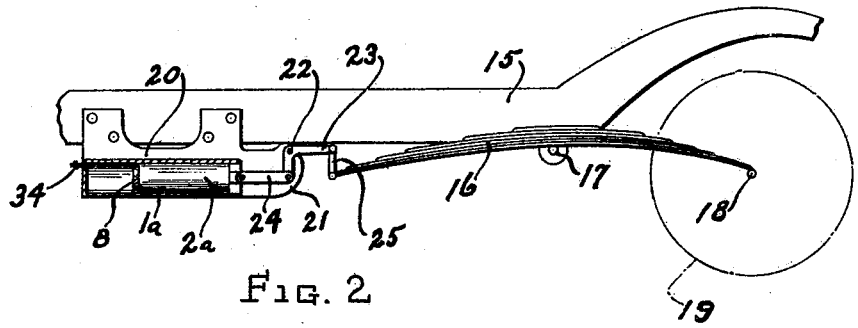
Figure 3:
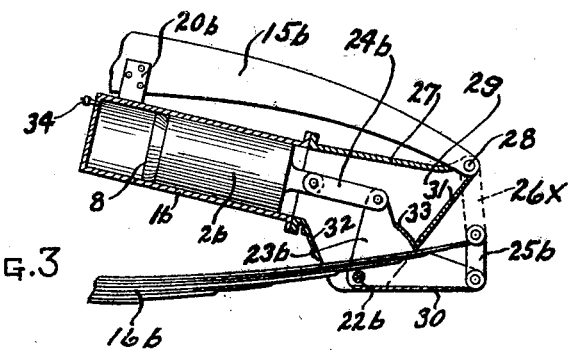

The exact nature of my invention together with further objects and advantages thereof will be apparent from the following description taken in connection with the accompanying drawing in which Fig. 1 shows in more or less diagrammatic form, in section, an elementary arrangement embodying the principles of my invention; and Figs. 2 and 3 show automotive application of the invention, in connection with cantilever and semi-elliptical springs respectively.

With reference now to Fig. 1 of the drawing, the principal parts are a pair of members 1 and 2 which may be generally cylindrical as indicated. The members are relatively movable as by the telescoping arrangement shown wherein the member 2 is slidable within the member 1. One end of the member 1 is closed as at 3. The members 1 and 2 thus comprise generally a cylinder and piston structure the member 1 serving as a cylinder within which the piston member 2 is relatively movable whereby a chamber 4 of variable volume, dependent upon relative movement of the parts 1 and 2, is had.

I also incorporate in one of the principal members an additional chamber of constant volume. In the example shown, the piston member 2 is hollow being closed by the end walls 5 and 6 to form the chamber 7 of constant volume. Thus the wall 6 is common to the variable volume chamber 4 and the constant volume chamber 7. Communication between the chambers is provided as shown by an opening 9 in the wall 6. Associated with the opening 9 is means forming a passage between the variable volume chamber 4 and the lower portion of the constant volume chamber 7, such means in the illustration comprising a tubular member 10, having a mouth 11 located longitudinally centrally of the member 2, and at its lowermost portion.

A sealing gasket 8 is associated with the piston to maintain a seal against the cylinder wall. In the structure illustrated the tubular member 10 is brazed or welded into the wall 6 with its end extending therebeyond and threaded as at 12. The gasket 8 is positioned between the wall 6 and a washer 13, the washer being secured in position by means of a nut 14 turned onto the threaded end of the member 10.

In use the chamber 4 is completely filled with a liquid preferably of lubricating qualities such as oil, and the chamber 7 is partially filled with the same liquid, the upper portion of the chamber 7, however, containing air under pressure. Admission of such air is had through the valve 34 which allows inlet to the chamber 7 but prevents egress therefrom.

When the apparatus contains pneumatic and liquid mediums as described and illustrated, and compressive forces F as indicated by the arrows are imposed upon the apparatus, obviously the forces F will tend to telescope the members 1 and 2 to decrease the volume of the variable chamber 4, the gasket 8 preventing outlet from the chamber 4 other than by way of the opening 9. Fluid therefore flows from the chamber 4 into the chamber 7 by way of the opening 9. Such flow obviously decreases the volume occupied by the gaseous content of the chamber 7 thus compressing the gas. The gas resists such compression having no means of egress from the chamber 7, so that a point is reached dependent upon the magnitude of the forces F, at which the gas is compressed to the extent that the parts are in equilibrium.

Upon diminution of the forces F the gas within the chamber 7 may expand and consequently does so, forcing liquid from the chamber 7 back into the chamber 4. The arrangement is such, as by virtue of the tubular member 10 that only liquid will pass into the chamber 4 from the chamber 7.

Thus the chamber 4 is at all times filled with liquid regardless of its volume and of the position in which the apparatus is arranged so that the gasket 8 always works upon a wet surface and a seal is always maintained.

With reference now to Fig. 2 of the drawing, 15 represents the rear portion of the frame of an automotive vehicle equipped with a cantilever spring arrangement including the multiple leaf spring 16 pivoted to the frame at 17 and carrying at its free end the axle 18 for the rear wheels 19 of the vehicle. The forward extremity of the spring 16, which would otherwise be confined by connection with the frame through a shackle, instead is associated with the frame through an application of my invention.

As indicated, the cylinder 1a is secured with the frame as by a bracket 20. The bracket has extensions 21 carrying a pivot bolt 22 for the bell crank 23. The bell crank has a downwardly extending arm which has connection by the link or connecting rod 24, with the piston 2a. The bell crank also has a rearwardly extending arm which has connection with the forward extremity of the spring 16 by the links 25.

The weight of the vehicle results in a force tending to move the axle 18 upward with respect to the frame 15. This in turn tends to move the spring 16 counterclockwise Fig. 2, about its connection 17 with the frame, so that the forward extremity of the spring tends to move downward. This force transmitted through the links 25 tends to move the bell crank 23 clockwise about its axis 22, so that by means of the connecting rod 24 the piston 2a is forced into the cylinder 1a.

It will be noted that by the described arrangement very little clearance is necessary for the addition of my pneumatic device to the yielding supporting system for the vehicle; the two chambers of the pneumatic device being cylindrical and aligned, occupy a minimum of space in transverse dimension; and the piston forming one of the chambers the longitudinal dimension is also a minimum.

With reference now to Fig. 3, 15b is the rear portion of a vehicle equipped with semi-elliptical spring 16b. Ordinarily the rear portions of the frame and spring would be interconnected by a shackle indicated by broken lines as at 26x. Instead, however, the cylinder 1b of my pneumatic device is mounted on the frame as by a bracket 20b at its end. The open end of the cylinder 1b is secured with a casing 27 which extends to the extremity of the frame 15b and there has connection with the frame as by the pin 28; so that the cylinder 1b is firmly secured with the frame. The casing 27 has sides 29 extending downwardly on either side of the spring 16b to carry the pin 22b therebelow. Upon the pin 22b is mounted a bell crank 23b. One arm of this bell crank has connection with the piston 2b of my pneumatic device, through the connecting rod or link 24b; and the other end of the bell crank has connection with the rear extremity of the spring 16b as by a shackle 25b. The lower portion of the bell crank 23b may include a web 30 extending between the side members of which the bell crank is formed, and the casing 27 may include end members 31 and 32, one of these end members being preferably removable. The bell crank may also have a transverse web 33 arcuate about the pin 22b. In this manner the open mouth of the cylinder 1b is substantially protected against mud, etc. thrown by the wheels.

It will be obvious that in the construction of Fig. 3 the air spring is in its action interposed between the frame 15b and the body 16b, relative upward thrust of the spring end being transmitted through the shackle 25b to the rear arm of the bell crank 23b tending to rotate the bell crank counterclockwise Fig. 3, so that the upper arm of the bell crank forces, through the connecting rod 24b, the piston 2b into the cylinder 1b.

What I claim is:

1. Apparatus of the class described, comprising horizontally disposed cylinder and piston parts cooperative to form an expansible chamber, means providing a constant volume chamber in aligned relation with said expansible chamber and separated therefrom by a wall transverse to the axis of said parts, said wall having a central opening, and means associated with said wall to form a passageway leading from the lower portion of said constant volume chamber to said opening.

2. Apparatus of the class described, comprising a horizontally disposed hollow piston, a cylinder cooperative therewith to form an expansible chamber, and means associated with said piston to provide communication between said expansible chamber and the lower portion of the hollow of said piston.

3. Apparatus of the class described, comprising a horizontally disposed hollow piston, a cylinder cooperative therewith to form an expansible chamber, the end wall of said piston separating said hollow piston from said chamber having a central opening, and means carried by said piston and associated with said opening to connect therewith the lower portion of the hollow of said piston.

In testimony whereof I hereby affix my signature.

WILFRED A. EATON.